(12) United States Patent
Yoon et al.

(10) Patent No.: US 9,230,559 B2
(45) Date of Patent: Jan. 5, 2016

(54) SERVER AND METHOD OF CONTROLLING THE SAME

(71) Applicant: SAMSUNG ELECTRONICS CO., LTD., Suwon-si (KR)

(72) Inventors: Seung-il Yoon, Seoul (KR); Tae-hwan Cha, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 264 days.

(21) Appl. No.: 13/918,538

(22) Filed: Jun. 14, 2013

(65) Prior Publication Data
US 2013/0339032 A1 Dec. 19, 2013

(30) Foreign Application Priority Data

Jun. 15, 2012 (KR) .................... 10-2012-0064505

(51) Int. Cl.
| | | |
|---|---|---|
| *G10L 21/00* | (2013.01) | |
| *G10L 21/06* | (2013.01) | |
| *H04N 21/422* | (2011.01) | |
| *H04N 21/472* | (2011.01) | |
| *G10L 15/22* | (2006.01) | |
| *G10L 25/54* | (2013.01) | |

(52) U.S. Cl.
CPC ............... *G10L 21/06* (2013.01); *G10L 15/22* (2013.01); *G10L 25/54* (2013.01); *H04N 21/42203* (2013.01); *H04N 21/472* (2013.01)

(58) Field of Classification Search
CPC ............... G06F 2221/0706; G06F 2221/0759; G06F 17/27; G06F 17/30011; G06F 11/3495; G06F 11/3409; G06F 15/173; G06F 11/0736; G06F 13/385; G06F 17/30867; G06F 21/51; G06F 3/048; G06F 7/00; G06F 9/5061

USPC ......... 704/201, 251, 235, 270, 255, 257, 275, 704/1–10, 231, 270.1
See application file for complete search history.

(56) References Cited

U.S. PATENT DOCUMENTS 8,023,624 B2 9/2011 Kargman et al.
2004/0193420 A1 9/2004 Kennewick et al.
(Continued)

FOREIGN PATENT DOCUMENTS

KR 10-2008-0066850 A 7/2008

OTHER PUBLICATIONS

International Search Report (PCT/ISA/210) dated Oct. 22, 2013, issued by the International Searching Authority in corresponding International Application No. PCT/KR2013/005247.
(Continued)

*Primary Examiner* — Huyen Vo
(74) *Attorney, Agent, or Firm* — Sughrue Mion, PLLC

(57) ABSTRACT

A server which interacts with a display apparatus is provided. The server includes a storage unit configured to store conversation patterns for each service domain, a communication unit configured to receive a user's voice from the display apparatus, and a control unit configured to determine a service domain including the user's voice, generate response information corresponding to the user's voice based on a conversation pattern of the determined service domain, and to control the communication unit to transmit the response information to the display apparatus. When it is determined that a currently received user's voice is included in another service domain which is different from a service domain including a previously received user's voice, the control unit generates the response information corresponding to the currently received user's voice based on a conversation pattern of the other service domain.

15 Claims, 7 Drawing Sheets

(56) References Cited

U.S. PATENT DOCUMENTS

| | | | |
|---|---|---|---|
| 2007/0116236 | A1 | 5/2007 | Kargman et al. |
| 2008/0048908 | A1 | 2/2008 | Sato |
| 2008/0319748 | A1* | 12/2008 | Nakano et al. ............... 704/251 |
| 2010/0296638 | A1 | 11/2010 | Wang |
| 2011/0009096 | A1 | 1/2011 | Rotsztein et al. |
| 2011/0064208 | A1 | 3/2011 | Kargman et al. |
| 2011/0184730 | A1* | 7/2011 | LeBeau et al. ............... 704/201 |
| 2012/0084079 | A1 | 4/2012 | Gruenstein et al. |

OTHER PUBLICATIONS

Written Opinion (PCT/ISA/237) dated Oct. 22, 2013, issued by the International Searching Authority in corresponding International Application No. PCT/KR2013/005247.

Communication dated Mar. 24, 2015 issued by European Patent Office in counterpart European Application No. 13172077.3.

De Mori, "Spoken Language Understanding: A Survey", Automatic Speech Recognition & Understanding, Dec. 1, 2007, 12 pages total, France.

Oh et al., "An Intelligent TV interface based on Statistical Dialogue Management", IEEE Transactions on Consumer Electronics, Nov. 4, 2007, 6 pages total, vol. 53 No. 4, IEE Service Center, New York, U.S.

Jeong et al., "Multi-domain spoken language understanding with transfer learning", Speech Communication, May 1, 2009, 13 pages total, vol. 51 No. 5, Elsevier Science Publishers, Amsterdam, NL.

Hakkani-Tur et al., "Employing Web Search Query Click Logs for Multi-Domain Spoken Language Understanding", 2011 IEEE Workshop on Automatic Speech Recognition and Understanding (ASRU 2011), Dec. 11-25, 2011, 6 pages total, IEEE, Waikoloa, Hawaii, USA.

* cited by examiner

SERVER AND METHOD OF CONTROLLING THE SAME

CROSS-REFERENCE TO RELATED APPLICATION

This application claims priority from Korean Patent Application No. 10-2012-0064505, filed on Jun. 15, 2012, in the Korean Intellectual Property Office, the disclosure of which is incorporated herein by reference in its entirety.

BACKGROUND

1. Field

Apparatuses and methods consistent with exemplary embodiments relate to a server and a method of controlling the same, and more particularly, to a server which controls a display apparatus capable of interacting with a user, and a method of controlling the same.

2. Description of the Related Art

With the development of electronic technology, various kinds of display apparatuses have been developed and spread, and have included various functions according to demand of the user. In particular, in recent years, the television (TV) has been connected to the Internet and supports an Internet service and, thus, the user can watch a large number of digital broadcasting channels through the TV.

In recent years, technology using voice recognition has been developed to control the display apparatus more easily and intuitively. In particular, the TV can recognize the voice of the user and perform a function corresponding to the voice of the user such as volume adjustment or channel change.

However, the display apparatus in the related art which recognizes the user's voice provides the function corresponding to the recognized voice, but the display apparatus does not to provide interactive information through the conversation of the user.

SUMMARY

One or more exemplary embodiments may overcome the above disadvantages and other disadvantages not described above. However, it is understood that one or more exemplary embodiments are not required to overcome the disadvantages described above, and may not overcome any of the problems described above.

One or more exemplary embodiments are to provide a server capable of controlling a display apparatus which interacts with a user by considering a service domain including the user's voice, and a method of controlling the same.

According to an aspect of an exemplary embodiment, there is provided a server which interacts with a display apparatus. The server may include: a storage which stores conversation patterns for service domains; a communicator configured to receive a voice expression from the display apparatus; and a controller configured to determine a service domain related to the voice expression, generate response information corresponding to the voice expression based on a conversation pattern of the determined service domain, and to control the communication unit to transmit the response information to the display apparatus. When it is determined that a currently received voice expression is included in another service domain which is different from a service domain including a previously received voice expression, the controller generates the response information corresponding to the currently received voice expression based on a conversation pattern of the other service domain.

When it is determined that the currently received voice expression is included in the other service domain even before slots constituting the service domain are filled with the previously received voice expression, the controller generates the response information corresponding to the currently received voice expression based on the conversation pattern of the other service domain.

The controller determines an utterance intention included in the currently received voice expression, generates the response information corresponding to the determined utterance intention based on the conversation pattern of the other service domain, and controls to the communicator to transmit the response information to the display apparatus.

The response information comprises response message information corresponding to the voice, and the display apparatus outputs a response message corresponding to the voice based on the response message information.

The response information further comprises a control command for controlling a function of the display apparatus.

According to another aspect of an exemplary embodiment, there is provided a method of controlling a server which interacts with a display apparatus. The method may include: receiving a voice expression from the display apparatus; determining a service domain including the voice, using conversation patterns; generating response information corresponding to a currently received voice expression based on a conversation pattern of another service domain when the currently received voice expression is included in the other service domain which is different from a domain having a previously received voice expression; and transmitting the generated response information to the display apparatus.

The generating comprises generating the response information corresponding to the currently received voice based on the conversation pattern of the other service domain when it is determined that the currently received voice expression is included in the other service domain before slots constituting the service domain are filled with the previously received voice expression.

Alternatively, the generating comprises determining an utterance intention included in the voice expression and generating the response information corresponding to the determined utterance intention based on the conversation pattern of the other service domain.

The response information comprises response message information corresponding to the voice expression, and the display apparatus outputs a response message corresponding to the voice expression based on the response message information.

The response information further comprises a control command for controlling a function of the display apparatus.

As described above, according to the various exemplary embodiments, although a service domain including a voice expression is changed, it is possible to output a response message corresponding to the voice expression based on the changed service domain. Therefore, it is possible to interact between the user and the display apparatus without interruption regardless of the service domain.

The above-described voice expression may be a voice expression of a user.

According to another aspect of an exemplary embodiment, there is provided a server which interacts with a display apparatus. The server may comprise: a storage which stores conversation patterns for service domains; a communicator configured to receive a voice expression from the display apparatus; and a controller configured to determine a service domain among a plurality of service domains, each of said plurality of service domains being related to a corresponding conversation pattern, generate response information corresponding to the voice expression based on a conversation pattern of the determined service domain, and to control the communicator to transmit the response information to the display apparatus.

The controller may control the communicator to determine an utterance intention included in the received voice expression, generate the response information corresponding to the determined utterance intention based on the conversation pattern, and transmit the response information to the display apparatus.

According to yet another exemplary embodiment, there is provided a method of controlling a server which interacts with a display apparatus, the method comprising: receiving a voice expression from the display apparatus; determining a service domain related to the voice expression among a plurality of service domains, using conversation patterns, each of the plurality of service domains being related to corresponding conversation patterns; generating response information corresponding to the voice expression based on a conversation pattern of the determined service domain; and transmitting the generated response information to the display apparatus.

Additional aspects of the exemplary embodiments will be set forth in the detailed description, will be obvious from the detailed description, or may be learned by practicing the exemplary embodiments.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF THE EXEMPLARY EMBODIMENTS

Figure 1:
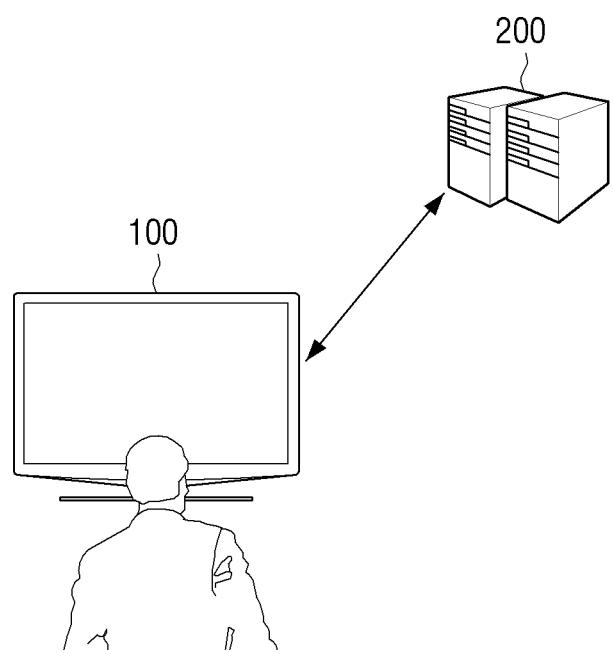
FIG. 1 is a view illustrating an interactive system according to an exemplary embodiment.

Hereinafter, exemplary embodiments will be described in more detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a view illustrating an interactive system according to an exemplary embodiment. As shown in FIG. 1, the interactive system includes a display apparatus 100 and a server 200. Although the display apparatus 100 may be a smart TV as shown in FIG. 1, this is merely illustrative. The display apparatus may be implemented with various electronic devices, for example, a mobile phone such as a smart phone, a desktop personal computer (PC), a laptop PC, a navigation system, or the like.

Herein, the display apparatus 100 may be controlled by a remote controller (not shown) to control the display apparatus 100. For example, if the display apparatus 100 is implemented with a television, the operation such as power on/off, channel change, and volume adjustment may be performed according to a control signal received from the remote controller (not shown).

The display apparatus 100 may transmit a collected user's voice to the server 200, and the server 200 may generate response information corresponding to the user's voice received from the display apparatus 100 and transmit the generated response information to the display apparatus 100. A user's "voice" may include voice data, a voiced statement of a user, a voiced question of a user, a voiced sound of a user, a voiced expression, or the like.

Specifically, the server 200 may determine a service domain including the user's voice, and generate the response information of the user based on a conversation pattern of the determined service domain. For example, when the voiced expression, "what is the name of the program being broadcasted currently?", is collected, the server 200 may determine the received voice as a broadcasting service domain, determine a response corresponding to the received voice in a conversation pattern stored in a broadcasting service domain, and transmit the response to the display apparatus 100.

The display apparatus 100 may perform various operations based on the response information received from the server 200. In the above-described example, the display apparatus 100 may output a message "The inquired title of the program is ○○○" as the response for the voiced expression, "What is the name of the program being broadcasted currently?", in a voice or text form, or a combination of, on the basis of the response information.

Even when the service domain including the currently collected user's voice is different from a service domain including a previously collected user's voice, the display apparatus 100 may output the response message corresponding to the currently corrected user's voice or perform the function corresponding to the user's voice.

That is, when it is determined that the service domain including the currently received user's voice is different from the service domain including the previously received user's voice from the display apparatus 100, the server 200 may generate the response information corresponding to the currently received user's voice using a conversation pattern of another service domain and transmit the response information to the display apparatus 100.

In the above-described example, it is assumed that the voiced expression, "How's the weather today?" is received from the display apparatus 100 after the voiced expression, "What is the name of the program being broadcasted currently?", is received. In this case, when it is determined that the service domain including the currently received user's voice is a weather service domain, the server 200 detects a response corresponding to the currently received user's voice in a conversation pattern stored in the weather service domain, and transmits the detected response "Let's know the desired area." to the display apparatus 100.

As described above, the interactive system according to the exemplary embodiment can provide a continuous response to the user even when the voice currently uttered by the user is included in another service domain which is different from the service domain including the previously uttered voice.

Figure 2:
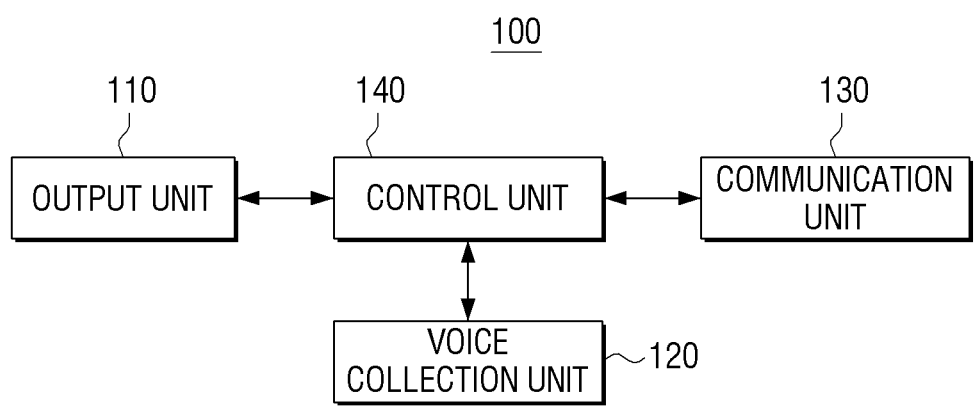
FIG. 2 is a block diagram illustrating a configuration of a display apparatus according to an exemplary embodiment.

FIG. 2 is a block diagram illustrating a configuration of a display apparatus according to an exemplary embodiment. Referring to FIG. 2, the display apparatus 100 includes an output unit 110, a voice collection unit 120, a communication unit 130, and a control unit 140.

The output unit 110 outputs at least one of video and audio. Specifically, the output unit 110 may output the response message corresponding to the user's voice collected through the voice collection unit 120 in at least one of a voice form, a text form, or a combination thereof.

Thus, the output unit 110 may include a display unit (not shown) and an audio output unit (not shown).

Specifically, the display unit (not shown) may be implemented with a liquid crystal display (LCD), an organic light emitting display (OLED), or a plasma display panel (PDP) and provide various display screens which can be provided through the display apparatus 100. In particular, the display unit (not shown) may display the response message corresponding to the user's voice in a text form or an image form.

Here, the display unit (not shown) may be implemented with a touch screen type in which the display unit and a touch pad form a mutual layer structure, and the touch screen may be configured to detect a location, an area, pressure of a touch input.

The audio output unit (not shown) may be implemented with an output port such as jacks and the like or a speaker and output the response message corresponding to the user's voice in a voice form.

Meanwhile, the output unit 110 may output various video and audio. Herein, the video and audio may be video and audio constituting broadcasting contents, multi-media contents, and so on.

The voice collection unit 120 collects the user's voice. For example, the voice collection unit 120 may be implemented with a microphone configured to collect the user's voice. The voice collection unit 120 may be integrally implemented with the display apparatus 100 within the display apparatus 100 or separately implemented from the display apparatus 100. When the voice collection unit 120 is separately implemented from the display apparatus 100, the voice collection unit 120 may be implemented with a grasp type or a type which can be placed on a cooktable or a table. The voice collection unit 120 may be connected to the display apparatus 100 through a wired or wireless network and transmit the collected user's voice to the display apparatus 100.

In addition, the voice collection unit 120 may determine whether the collected user's voice is a voice uttered by a user or not, and filter noise from the voice (for example, air conditioning sound, cleaning sound, music sound, and the like).

For example, when the analog user's voice is input, the voice collection unit 120 samples the analog user's voice and converts the user's voice into a digital signal. The voice collection unit 120 calculates energy of the converted digital signal and determines whether or not the energy of the digital signal is equal to or larger than a preset value.

When it is determined that the energy of the digital signal is equal to or larger than the preset value, the voice collection unit 120 removes a noise and transmit a noise-removed voice. The noise component is a sudden noise which can occur in the home environment such as air conditioning sound, cleaning sound, or music sound. When it is determined that the energy of the digital signal is less than the preset value, the voice collection unit 120 performs no processing on the digital signal and waits for another input. Accordingly, the whole audio processing procedure is not activated by the other sounds other than the user's uttered voice so that the unnecessary power consumption can be prevented.

The communication unit 130 performs communication with the server (200 of FIG. 1). Specifically, the communication unit 130 may transmit the user's voice to the server 200 and receive the response information corresponding to the user's voice from the server 200.

For this reason, the communication 130 may perform communication with the server 200.

For example, the communication unit 130 may perform communication with the server 200 using wired/wireless LAN (Local Area Network), WAN, Ethernet, Bluetooth, Zigbee, USB (Universal Serial Bus), IEEE1394, WiFi, and so on. To do so, the communication unit 130 may comprise a chip or an input port and the like corresponding to each communication method. For example, when communication is performed based on a wired LAN method, the communication unit 130 may comprise a wired LAN card (not shown) and an input port (not shown).

The control unit 140 controls an overall operation of the display apparatus 100. Specifically, the control unit 140 may control to the voice collection unit 120 to collect a user voice and control to the communication unit 130 to transmit the collected user voice to the server 200. In addition, the control unit 140 may control the communication unit 130 to receive the response information corresponding to the user's voice from the server 200.

The control unit 140 may control the output unit 110 to output a response message corresponding to the user's voice based on the response information received from the server 200.

Here, the response information may include response message information for outputting the response message. The response message information is information in which the response message corresponding to the user's voice is represented in a text form, and the control unit 140 may output the response message corresponding to the user's voice in at least one of a voice form and a text form through the output unit 110, based on the response message information.

Specifically, the control unit 140 may convert the text-type response message information into voice using a Text to Speech (TTS) engine and output the voice through the output unit 110. Here, the TTS engine is a module configured to convert a text into voice and may convert the text into the voice using the disclosed various TTS algorithms. Further, the control unit 140 configures a user interface (UI) screen including the text constituting the response message information and outputs the UI screen through the output unit 110.

For example, when the display apparatus 100 which is implemented with a television collects a user voice "when does the program start?", the server 200 may transmit "which program do you mean?" in the text form to the display apparatus 100. In this case, the controller 140 may control to convert "which program do you mean?" into a voice and output the voice through the output unit 110, or may compose and output a screen including the text of "which program do you mean?" through the output unit 110.

As described above, the case in which no function is performed in the display apparatus and the control unit 140 outputs the response message corresponding to the user's voice may be a case in which the user's voice may include contents requesting a function which cannot be executed in the display apparatus 100, to be executed, or may include a question which requires an answer.

For example, when the display apparatus 100 is implemented with a smart TV, and "Call XXX", as the user's voice, is input, but a video call function is not supported, the control unit 140 may perform no processing, and output the response message "the function is not supported" in at least one of a text form and a voice form through the output unit 110, based on the response message information. Further, when the display apparatus 100 is implemented with a smart TV, and "Let's know the name of the most popular program", as the user's voice is input, the control unit 140 may perform no processing and output the response message "The most popular program is ○○○ (the name of the program)" in at least one of a text form and a voice form through the output unit 110, based on the response message information.

The response information may further include a control command for controlling the function of the display apparatus 100. Thus, the control unit 140 may control the respective components of the display apparatus 100 to execute a specific function executable in the display apparatus 100 according to the type of the display apparatus 100, based on the control command received from the server 200.

For example, when the display apparatus 100 is implemented with a television and "Turn up the volume", as a user voice, is collected, the server 200 may transmit a control command to turn up the volume of the display apparatus 100 to the display apparatus 100. In this case, the control unit 140 may increase audio volume output through the output unit 110 based on the control command. However, this is only an example, the control unit 140 may control each component of the display apparatus 100 so that various operations such as power on/off, channel change, and volume adjustment can be performed according to a collected user voice.

In addition, the response information may include a control command for controlling the function of the display apparatus 100 and response message information related to the specific function executed according to the control command. In this case, the control unit 140 may perform the function according to the executed command and output the response message related to the control command in at least one of a text form and a voice form through the output unit 110.

For example, when the user's voice includes contents which can execute the function executable in the display apparatus 100, the control unit 140 may perform the function intended by the user according to the control command received from the server 200, and output information related to the executed function in at least one of a text form and a voice form, based on the response message information received from the server 200. For example, when the display apparatus 100 is implemented with a smart TV, and "Change the channel to No. 11" is expressed as the user's voice, the control unit 140 may select the channel No. 11 according to the control command for changing the channel to No. 11, and output the response message "The channel has been changed to No. 11" or "Change in the channel has been completed" in at least one of a text form and a voice form through the output unit 110, based on the response message information.

In addition, even when the service domain including the currently collected user's voice is different from the service domain including the previously collected user's voice, the control unit 140 may output the response message corresponding to the currently collected user's voice or perform the function corresponding to the user's voice.

For example, it is assumed that the display apparatus 100 outputs the response message "The inquired program is ○○○ (the name of the program)" based on the response information received from the server 200 with respect to the previously collected user's voice "what is the name of the program being broadcasted currently?". Next, when the user's voice expression, and "How is the weather today?", which is included in another service domain different from the service domain including the previously user's voice, is collected, the control unit 140 may output the response message "Let's know the desired area" in at least one of a voice form and a text form through the output unit 110, based on the response information received from the server 200.

That is, even when slots provided in the specific service domain are not completely filled according to the user's voice, when the user's voice included in the other service domain is received next, the control unit 140 may output the response message corresponding to the next received user's voice.

Thus, when the user's voice included in the other service domain is received, the server 200 may generate the response information corresponding to the user's voice based on a conversation pattern of the other service domain, and transmit the response information to the display apparatus 100. The above-described operation will be described later with reference to FIG. 4.

Although the above-described exemplary embodiment has illustrated the response message information transmitted from the server 200 in which the response message is represented in a text form, it is merely illustrative. That is, the response message information is voice data itself constituting the response message output from the display apparatus 100 or a portion of the voice data constituting the corresponding response message. Alternatively, the response message information may have a form of a control signal for outputting the corresponding response message using the voice or text pre-stored in the display apparatus 100.

Therefore, the control unit 140 may output the response message by considering the type of the response message information. Specifically, when the voice message itself constituting the response message is received, the control unit 140 may process the corresponding data in a form which can be output in the output unit 110 and output the processed data.

When the control signal for outputting the response message is received, the control unit 140 may search data which matches with the control signal among the data pre-stored in the display apparatus 100, process the searched voice or text data in a form which can be output, and output the processed data through the output unit 110. Therefore, the display apparatus 100 may have stored voice or text data for providing the response message related to the function execution or voice or text data related to request for providing the information. For example, the display apparatus 100 may store data in a form of a complete sentence such as "Change in the channel is completed" or partial data constituting a sentence such as "The channel is changed to No.xx". In this case, the name of the channel for allowing the corresponding sentence to be completed may be received from the server 200.

Figure 3:
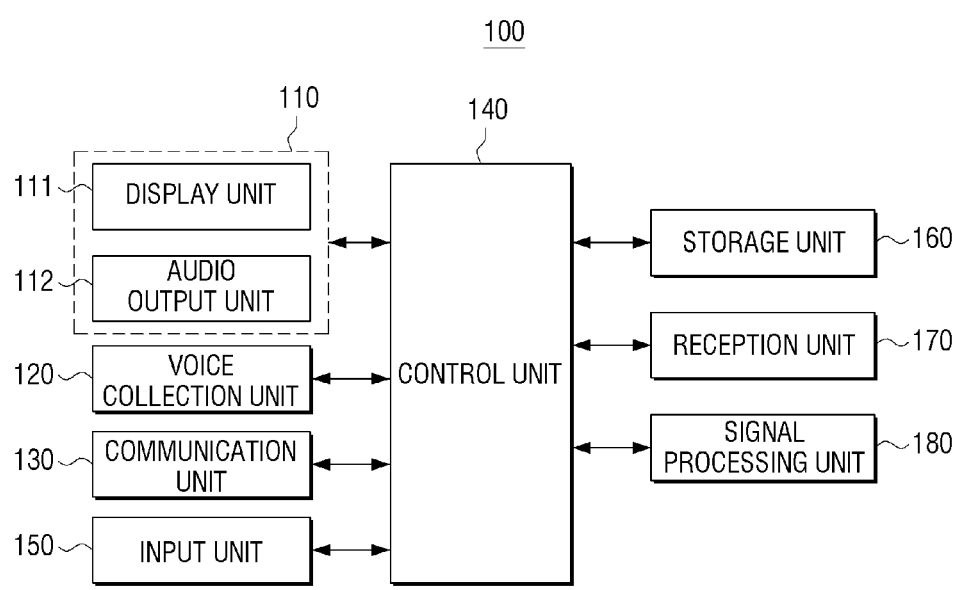
FIG. 3 is a block diagram illustrating a detailed configuration of the display apparatus illustrated in FIG. 2.

FIG. 3 is a block diagram illustrating a detailed configuration of the display apparatus illustrated in FIG. 2. Referring to FIG. 3, the display apparatus 100 may further include an input unit 150, a storage unit 160, a reception unit 170, and a signal processing unit 180 in addition to the components illustrated in FIG. 2. Portions of the components illustrated in FIG. 3 overlapping the components illustrated in FIG. 2 has the same function and thus detailed description thereof will be omitted.

The input unit 150 is an input unit configured to receive a user's various operations and transmit the received operations to the control unit 140 and may be implemented with an input panel. Here, the input panel may be a touch pad type, a key pad type including various function keys, number keys, specific keys, character keys, and the like, or a touch screen type. In addition, the input unit 160 may be implemented with an infrared (IR) reception unit (not shown) configured to receive a remote control signal transmitted from a remote controller for controlling the display apparatus 100.

The input unit 150 may receive a user's various operations for controlling the function of the display apparatus 100. For example, when the display apparatus 100 is implemented with a smart TV, the input unit 150 may receive the user's operation for controlling the function of the smart TV such as power on/off, channel change, and volume adjustment. In this case, the control unit 140 may control the other components to perform various functions corresponding to the user's operation input from the input unit 150. For example, when the power-off command is received, the control unit 140 may interrupt the power supplied to the respective components of the display apparatus 100. When the channel-change command is received, the control unit 140 may control the reception unit 170 to select the channel selected by the user's operation.

In particular, the input unit 150 receives the user's operation to start a voice recognition mode for collecting the user's voice. For example, the input unit 150 may be implemented with the touch screen type together with the display unit, and may display an object (for example, an icon) for receiving the voice recognition mode. Alternatively, the input unit 150 may include a separate button for receiving the voice recognition mode. When the user's operation to start the voice recognition mode is received through the input unit 150, the control unit 140 may activate the voice collection unit 120 and collect the user's voice uttered within a preset range. Then, the control unit 140 may control to receive the response information corresponding to the user's voice collected through communication with the server 200, and output the response message or execute the specific function.

The storage unit 160 is a storage medium configured to store various programs necessary for operating the display apparatus 100, and may be implemented with a memory, a hard disc drive (HDD), and the like. For example, the storage unit 160 may include a read only memory (ROM) configured to store a program for executing an operation of the control unit 140, a random access memory (RAM) configured to temporarily store data according to execution of the operation of the control unit 140, and the like. The storage unit 160 may further include an electrically erasable and programmable ROM (EEPROM) configured to store various reference data, and the like.

In particular, the storage unit 160 may have previously stored the various response messages corresponding to the user's voice in a voice or text form. Therefore, the control unit 140 may read at least one among the voice and text data corresponding to the voice message information (specifically, control signal) received from the server 200, and output the read data to an audio output unit 112 or a display unit 111. In this case, the control unit 140 may perform signal processing such as decoding for voice data, amplify the decoded voice data, and output the amplified voice data to the audio output unit 112. Alternatively, the control unit 140 may configure a UI screen including a text constituting the text data, and output the UI screen through the display unit 111. Although the above-described exemplary embodiment has illustrated that the control unit 140 perform the signal processing for the voice and text data read from the storage unit 160, the control unit may control the signal processing unit 180 to perform the signal processing for the voice and text data.

The reception unit 170 receives various contents. Specifically, the reception unit 170 receives the contents from a broadcasting station configured to transmit broadcasting program contents using a broadcasting network or a web server configured to transmit content files using Internet. Further, the reception unit 170 may receive the contents from various recording medium reproducing apparatus provided in the display apparatus 100 or connected to the display apparatus 100. The recording medium reproducing apparatus is an apparatus configured to reproduce the contents stored in the various kinds of recording media such as a compact disc (CD), a digital versatile disc (DVD), a blu-ray disc, a memory card, or a universal serial bus (USB) memory.

In an exemplary embodiment which receives contents from a broadcasting station, the reception unit 170 may be implemented to include a configuration such as a tuner, a demodulator, an equalizer, and the like which are not illustrated in FIG. 3. In an exemplary embodiment which receives contents from a source such as the web server, the reception unit 170 may be implemented with a network interface card (not shown). Alternatively, in an exemplary embodiment which receives contents from the above-described various recording medium reproducing apparatuses, the reception unit 170 may be implemented with an interface unit (not shown) connected to the recording medium reproducing apparatus. As described above, the reception unit 170 may be implemented with various types according to the exemplary embodiments.

The signal processing unit 180 performs signal processing for the contents received through the reception unit 170 to be output through the output unit 110.

Specifically, the signal processing unit 180 may perform an operation on a video signal included in the contents such as decoding, scaling, and a frame-rate conversation and convert the processed video signal into a video signal in a form which can be output in the display unit 111. Further, the signal processing unit 180 may perform signal processing on an audio signal included in the contents, and convert the processed audio signal into an audio signal in a form which can be output in the audio output unit 112.

Figure 4:
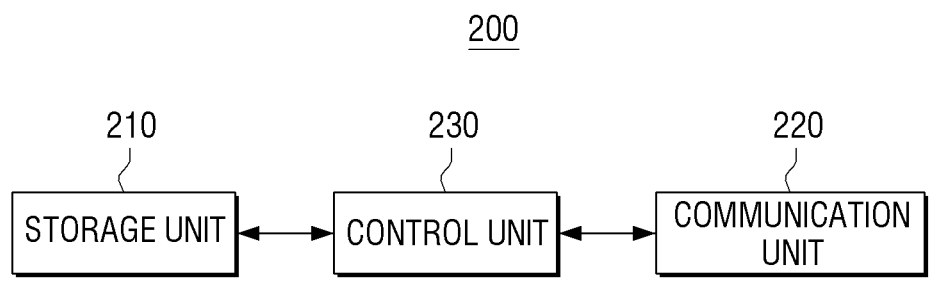
FIG. 4 is a block diagram illustrating a configuration of a server according to an exemplary embodiment.

FIG. 4 is a block diagram illustrating a configuration of a server according to an exemplary embodiment. Referring to FIG. 4, the server 200 includes a storage unit 210, a communication unit 220, and a control unit 230.

The storage unit stores conversation patterns for each of service domains. Here, the service domains may be categorized into "broadcasting", "VOD", "application management", "apparatus management", "information(weather, stock, news, and the like), and etc. according to a subject in which the voice uttered by the user is included. However, this is only an example, the service domains may be classified according to other various subjects.

More specifically, the storage unit 210 may comprise a corpus database for each service domain. Herein, the corpus database may be implemented to store exemplary sentences and the corresponding responses. That is, the storage unit 210 may store a plurality of exemplary sentences and responses to each sentence for each service domain. In addition, the storage unit 210 may tag information to interpret the exemplary sentences and expected responses to the sentences to each sentence and store the same For example, the storage unit 210 may include a first corpus database for a broadcasting service domain and a second corpus database for a weather service domain.

In this case, the first corpus database may store various conversation patterns which can be generated in the broadcasting service domain.

For example, suppose a case where the exemplary sentence of "when does the program start?" is stored in a broadcasting service domain.

In this case, the storage unit 210 may tag information to interpret sentences such as "when does the program start?"to the corresponding sentence and store the same.

Specifically, the storage unit 210 may tag information that "program" means a broadcasting program, "when . . . start" is to ask about a broadcasting time, and "when . . . ?" means it is an interrogative sentence to the corresponding sentence and store the same.

In addition, the storage unit 210 may tag response to "what does the program start?" to the corresponding sentence and store the same. Specifically, the storage unit 210 may tag "which program do you want to know?" as a response and store the same.

However, this is only an example, and the storage unit 210 may store the sentence, "when does OOO (name of a broadcasting program) start?", and tag information to interpret the sentence and a response to the corresponding sentence and store the same.

Specifically, with respect to the sentence such as "when does OOO (name of a broadcasting program) start?", the storage unit 210 may tag information that "OOO (name of a broadcasting program)" means a broadcasting program, "when . . . start" is to ask about a broadcasting time, and "when . . . ?" means it is an interrogative sentence to the corresponding sentence and store the same. In addition, the storage unit 210 may tag information that a word related to a broadcasting program appears in a sentence such as "when . . . ?" to the corresponding sentence and store the same. Herein, the word related to a broadcasting program may include the name of a broadcasting program, an actor, and a producer.

In addition, the storage unit 210 may tag a response to "when does OOO (name of a broadcasting program) start?" to the corresponding sentence and store the same. Specifically, the storage unit 210 may tag "the broadcasting time of <the name of the broadcasting program> you asked is <broadcasting time>" as a response to "when does OOO (name of a broadcasting program) start?" and store the same.

As such, the storage unit 210 may store various conversation patterns in a broadcasting service domain.

The second corpus database may store the conversation pattern which can occur in the weather service domain.

For example, suppose a case where "what is the weather like in OOO (name of an area)?" is stored in a weather service domain.

In this case, the storage unit 210 may tag information to interpret the sentence such as "what is the weather like in OOO (name of an area)?" to the corresponding sentence and store the same. Specifically, the storage unit 210 may tag information that "OOO (name of an area)" means the name of an area, "what is the weather like . . . " is to ask about weather, and "what . . . ?" means that it is an interrogative sentence to the corresponding sentence and store the same.

In addition, the storage unit 210 may tag a response to "what is the weather like in OOO (name of an area)?" to the corresponding sentence and store the same. Specifically, the storage unit 210 may tag "Do you want to know the temperature?" as a response to "what is the weather like in OOO (name of an area)?" and store the same.

However, this is only an example, and the storage unit 210 may store the sentence of "what is the temperature of OOO (name of an area)?", and may tag information to interpret the corresponding sentence and the response of "the temperature of OOO (name of an area) is <temperature>" to the corresponding sentence and store the same.

As such, the storage unit 210 may store various conversation patterns in a weather service domain.

In the above exemplary embodiment, exemplary sentences and the corresponding responses stored in the storage unit are described. However, this is only an example, and various exemplary sentences and corresponding responses may be stored in each service domain.

The communication unit 220 receives the user's voice from the display apparatus 100. The communication unit 220 may include a NFC module (not shown) configured to perform communication with the display apparatus 100 and various communication modules such as a wireless communication module (not shown). In addition, the communication unit 220 may perform communication with the display apparatus 100 using wired/wireless LAN, and the like.

The communication unit 220 may perform communication with the web server through the internet network, transmit various search keywords to the web server, and receive a web searching result corresponding thereto. Here, the search keywords may include various web-searchable keywords such as a weather-related keyword (for example, an area name, temperature, chance of rain, and the like), and a content-related keyword (for example, a title of a movie, a release day of a movie, a title of music, a singer, and the like) and may be pre-stored in the storage unit 210.

The control unit 230 controls an overall operation of the server 200. In particular, the control unit 230 determines a service domain including the user's voice, generates the response information corresponding to the user's voice based on the conversation pattern of the determined service domain, and controls the communication unit 220 to transmit the response information to the display apparatus 100.

Thus, the control unit 230 converts the received user's voice into a text using a Speech to Text (STT) algorithm. The control unit 230 may detect the user's utterance matched with the text converted in each corpus database, and determine the service domain including the user's voice.

Specifically, the control unit 230 may compare a text with sentences stored in each service domain, and determine a service domain where a sentence matching with a received text belongs as a service domain including a user's voice.

Then, the control unit 230 extracts a dialog act, a main action, and a component slot from the user's voice based on the service domain including the user's voice. For example, the control unit 230 may extract the dialogue act and the main action using a Maximum Entropy Classifier (MaxEnT) and the component slot using a conditional Random Field (CRF), from the user's voice. However, the extraction operation of the user's voice is not limited thereto, and the dialogue act, the main action, and the component slot may be extracted through known various methods. For example, the control unit 230 may extract a dialogue act, a main action, and a component slot from a user voice using information tagged to a sentence matched with the user voice.

Here, the dialogue act indicates whether the corresponding sentence is a statement, a request, a WH-question, or an YN-question. The main action is semantic information representing the desired action by the corresponding utterance through the conversation in a specific domain. For example, the main action may include TV on/off, seeking a program, finding a programming time, program scheduling, and the like. The component slot is object information for the specific domain represented in the utterance, that is, additional information for specify means of an action intended in the specific domain. For example, the component slot may include a genre, a title of a program, a starting time, a name of a channel, a name of an actor, and the like.

The control unit 230 may determine utterance intention included in the user's voice using the extracted dialogue act, main action, and component slot, generate response information corresponding to the determined utterance intention, and transmit the response information to the display apparatus 100.

Here, the response information includes response message information corresponding to the user's voice. The response message information may be information in which the response message output from the display apparatus 100 is represented in a text form. The display apparatus 100 may output the response message corresponding to the user's voice based on the response message information received from the server 200.

Specifically, the control unit 230 may extract the response for the determined utterance intention from the corpus database, convert the extracted response into a text, and generate the response message information.

For example, it is assumed that the user's voice to "When is the time to start ∘∘∘ (the name of the program)" is received from the display apparatus 100. In this case, the control unit 230 may search the corpus database present in the user's utterance matched with the user's voice converted in a text form, and determine that the voice "When is the time to start ∘∘∘ (the name of the program)" is included in the broadcasting service domain.

Then, the control unit 230 determines that the sentence of the corresponding voice is a question through the dialogue act, and that the user wants to know "the starting time of the program for ∘∘∘" through the main action and the component slot. As a result, the control unit 230 may determine that the utterance intention included in the received user's voice is to "inquire a starting time of the program for ∘∘∘ (the name of the program)".

Then, the control unit 230 extracts the response "the inquired starting time of ∘∘∘ is xxx" from the corpus database of the broadcasting service domain with respect to the utterance intention for "inquiring the starting time of the program for ∘∘∘". That is, the control unit 230 may search a response matched with "When is the time to start ∘∘∘ (the name of the program)?" from the corpus database of a broadcasting service domain, and extract "the starting time of the program for ∘∘∘ is . . . " as a response. In this case, the control unit 230 may search the broadcasting starting time for "∘∘∘" using electronic program guide (EPG) information, generate response message information "The inquired starting time of ∘∘∘ is on Saturday at p.m. 7:00", and transmit the response message information to the display apparatus 100.

In addition, the control unit 230 may determine utterance intention of a user by using information tagged to a sentence matched with a received text.

For example, suppose a case where the text of "when does the program for ∘∘∘ (the name of the program) start?" is received from the display apparatus 100.

In this case, the control unit 230 may determine that the received text belongs to a broadcasting service domain and extract a dialogue act, a main action, and a component slot from the user voice using information tagged to "when does the program for ∘∘∘ (the name of the program) start?" which is the sentence matched with the received text in the broadcasting service domain so as to find out the utterance intention of the user voice.

That is, as information to interpret the sentence of "when does the program for ∘∘∘ (the name of the program) start?", the information that "∘∘∘ (the name of the program)" means a broadcasting program, "when . . . start" is to inquire about the broadcasting time, and "when . . . ?" means it is an interrogative sentence is tagged. Accordingly, based on the information, the control unit 230 may determine that the dialogue act of the received text of "when does the program for ∘∘∘ (the name of the program) start?" is an interrogative sentence, the main action is inquiring about the broadcasting time, and the component slot is ∘∘∘ (the name of the program). Accordingly, the control unit 230 may determine that the utterance intention of the user voice is to "inquire" about "the broadcasting time" of "∘∘∘ (the name of the program)".

In addition, in response to the utterance intention of "inquiring" about "the starting time of the program" of "∘∘∘ (the name of the program)", the control unit 230 may extract "the starting time of ∘∘∘ is <broadcasting time>" from the corpus database of the broadcasting service domain.

In this case, the control unit 230 may generate a sentence in a complete form by completing a blank included in a searched response.

For example, the control unit 230 may complete the response of "the broadcasting time of <blank (name of a broadcasting program> is <broadcasting time>" by write "∘∘∘ (the name of the program)" in the blank. In addition, the control unit 230 may search the broadcasting time of "∘∘∘ (the name of the program)" using EPG (Electronic Program Guide) information and write the searched broadcasting time in another blank of <broadcasting time>. Accordingly, the control unit 230 may generate response message information corresponding to the user voice using the complete sentence of "the broadcasting time of ∘∘∘ (the name of the program) is 7 o'clock on Saturday", and transmit the generated response message information to the display apparatus 100.

Accordingly, the display apparatus 100 may output "the broadcasting time of ∘∘∘ (the name of the program) is 7 o'clock on Saturday" in either a voice or a text form based on the response message information received from the server 200.

Further, the response information may further comprise a control command for controlling the function of the display apparatus 100. That is, the control unit 230 may generate the control command for causing the display apparatus 100 to perform the function corresponding to the utterance intention of the user.

Thus, the storage unit 210 may have pre-stored the control command corresponding to the user's utterance intention. For example, when the user's utterance intention is to change the channel, the storage unit 210 may match and store the control command for changing the channel of the display apparatus 110. When the user's utterance intention is to schedule a recording, the storage unit 210 may match and store the control command for executing the scheduled recording for a specific program in the display apparatus 100.

It is assumed that the user's voice "schedule ∘∘∘ (the name of the program)" is received from the display apparatus 100. In this case, the control unit 230 may search the corpus database including the user's utterance matching with the user's voice which is converted in a text form, and determine that the user's voice "schedule ∘∘∘" is included in the broadcasting service domain.

The control unit 230 determines that the corresponding voice is a sentence related to a "Request" through the dialogue act and that the user wants to "schedule the program for ∘∘∘ (the name of the program)" through the main action and the component slot. As a result, the control unit 230 may determine that the utterance intention included in the received user's voice is "Request the program scheduling for ∘∘∘ (the name of the program)".

Then, the control unit 230 may detect the control command corresponding to the utterance intention "Request the program scheduling for ∘∘∘ (the name of the program)" in the storage unit 210, and generate the control command for executing the scheduled recording function of ∘∘∘ (the name of the program)" in the display apparatus 100. In this case, the control unit 230 may extract the response message information "The scheduled recoding for the requested program is completed" to the utterance intention "Request the program scheduling for ○○○ (the name of the program)" from the corpus database of the broadcasting service domain, and transmit the response message information to the display apparatus 100.

When the control unit 230 can not determine the user's utterance intention included in the currently received user's voice, the control unit 230 may determine the user's utterance intention included in the currently received user's voice with reference to the previously received user's voice. That is, the control unit 230 may compare the currently received user's voice with the conversation pattern stored in the corpus database to determine whether or not the currently received user's voice is corresponding to the first user's utterance in the conversation pattern, and may determine the user's utterance intention included in the currently received user's voice with reference to the previously received user's voice when the currently received user's voice is not corresponding to the first user's utterance.

For example, it is assumed that the user's voice "When is the time to start ○○○ (the name of the program)?" is input and then the user's voice "The casts?" is input. In this case, when the control unit 230 determines that the user's voice "The casts?" is not corresponding to the first user's utterance in the broadcasting service domain, the control unit 230 determines the utterance intention of "The casts?" based on the user's voice "When is the time to start ○○○?" previously received.

That is, to determine the utterance intention of the user's voice "The casts?" which can not extract the component slot, the control unit 230 may determine that the utterance intention of "The casts?" is "to inquire the cast for ○○○ (the name of the program)" using "○○○ (the name of the program)" included in the previously received user's voice.

As another example, it is assumed that the user's voice "□□□ (the name of the program)?" is input. In this case, to determine the utterance intention of "□□□ (the name of the program)" which can extract the main action", the control unit 230 may determine that the utterance intention included in "□□□ (the name of the program)?" is "to inquire the starting time of the program "□□□ (the name of the program)" using "When" included in the previously received user's voice.

When it is determined that the currently received user's voice is included in another service domain which is different from the service domain including the previously received user's voice, the control unit 230 generates the response information corresponding to the currently received user's voice based on a conversation pattern of the other service domain.

Specifically, even before all the slot constituting the service domain are filled with the previously received user's voice, the control unit 230 may generate the response information corresponding to the currently received user's voice based on the conversation pattern of the other service domain when it is determined that the currently received user's voice is included in the other service domain.

Here, the slot denotes a blank filled with the component slot extracted from the user's voice in each service domain. For example, in the case of the broadcasting service domain, the slot denotes the blank filled with the component slot such as a genre, a title of a program, a starting time, a name of a channel, or a name of an actor.

An exemplary embodiment determines the service domain including the received user's voice even when all empty slots constituting the service domain are not filled, and determines the utterance intention of the corresponding voice even when the user's voice is included in another service domain which is different from the service domain including the previously received user's voice.

For this reason, the control unit 230 determines whether or not the currently received user's voice matches with the corpus database of the service domain including the previously received user's voice.

When it is determined that currently received user's voice matches with the corpus database, the control unit 230 determines the utterance intention for the currently received user's voice using the corresponding service domain, and generates the response information corresponding to the utterance intention. The operation has been described above and thus overlapping description thereof will be omitted.

When it is determined that currently received user's voice does not match with the corpus database, the control unit 230 compares the currently received user's voice with another corpus database, and determines the service domain including the currently received user's voice.

Next, the control unit 230 may determine the utterance intention included in the currently received user's voice, generate the response information corresponding to the determined utterance intention based on the conversation pattern of the other service domain, and control the communication unit 210 to transmit the response information to the display apparatus 100.

That is, the control unit 230 extracts the dialogue act, the main action, and the component slot from the user's voice based on the service domain including the currently received user's voice. Then, the control unit 230 may determine the utterance intention included in the currently received user's voice using the extracted dialogue act, main action, and component slot, generate the response information corresponding to the determined utterance intention, and transmit the response information to the display apparatus 100. The detailed description thereof will be described with reference to FIG. 5.

FIG. 5 is a view illustrating an operation of an interactive system according to an exemplary embodiment.

Figure 5A:
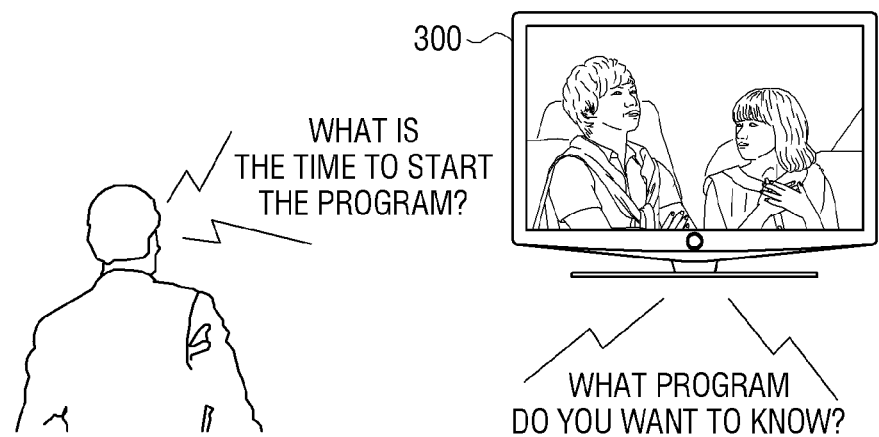
FIGS. 5A and 5B are views illustrating an operation of an interactive system according to an exemplary embodiment.

As shown in FIG. 5A, the display apparatus 300 interacts with a server (not shown), and may output the response message "What program do you want to know?" in a voice form when the user's voiced expression, "When is the time to start the program?", is received.

Figure 5B:
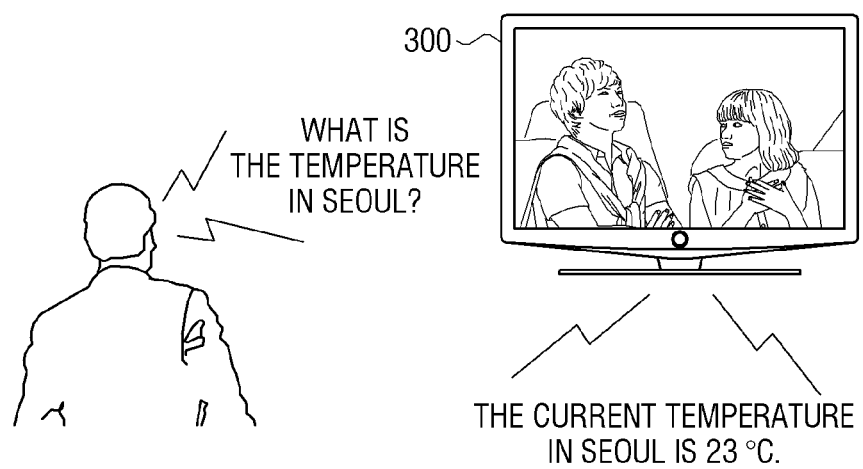

Then, as shown in FIG. 5B, it is assumed that the user's voice "When is the time to start the program?" included in the broadcasting service domain and the user's voice "What is the temperature in Seoul?" included in another service domain are received. In this case, the server determines the service domain including the user's voiced expression, "What is the temperature in Seoul?", even when all slots constituting the broadcasting service domain are not filled. Thus, when it is determined that the corresponding voice is included in the weather service domain, the server extracts the dialogue act, the main action, and the component slot from "What is the temperature in Seoul?" based on the weather service domain, and determines that the utterance intention included in the currently received user's voice is "to inquire temperature information of Seoul".

Then, the server extracts the response "The inquired current temperature of Seoul is xxx" to the utterance intention to "inquire the temperature information of Seoul" from the corpus database of the weather service domain. In this case, the server may extract "Seoul" and "Temperature" as a keyword from the corresponding voice and then transmit the keywords to a web server, and receive the searching result for the temperature of Seoul from the web server and then transmit the response message information "The current temperature of Seoul is 23° C." to the display apparatus 300. Therefore, the display apparatus 300 may output "The current temperature of Seoul is 23° C." as the response to "What is the temperature of Seoul?" included in the other service domain which is different from the domain including the previously received user's voice, in a voice form.

The above-described exemplary embodiment has illustrated that the server 200 is a single server, but this is merely illustrative.

That is, the server 200 may include a first server (not shown) configured to receive the user's voice from the display apparatus 100, convert the received user's voice into a text, and transmit the converted text to the display apparatus 100, and a second server (not shown) configured to receive the converted text from the display apparatus 100, generate the response information corresponding to the user's voice, and transmit the response information to the display apparatus 100.

Specifically, the first server may convert the received user's voice from the display apparatus 100 into the text using an STT algorithm, and transmit the converted text to the display apparatus 100. The second server may determine the user's utterance intention based on the received text, generate the response information corresponding to the user's utterance intention, and transmit the response information to the display apparatus 100.

Figure 6:
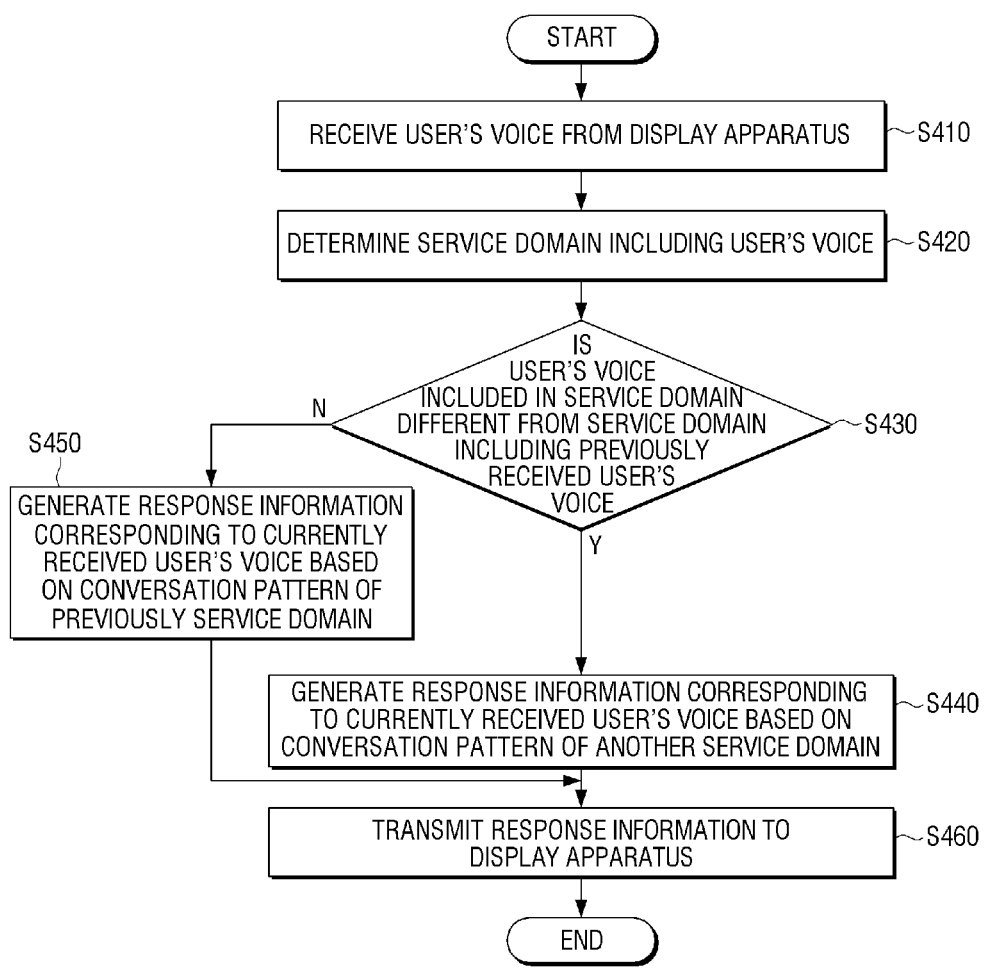
FIG. 6 is a flowchart illustrating a method of controlling a server according to an exemplary embodiment.

FIG. 6 is a flowchart illustrating a method of controlling a server which interacts with a display apparatus according to an exemplary embodiment.

First, the server receives a user's voice from the display apparatus (S410).

Next, the server determines a service domain including the user's voice using conversation patterns for pre-stored service domains (S420).

Subsequently, when it is determined that a currently received user's voice is included in another service domain which is different from a domain including a previously received user's voice (S430-Y), the server generates response information corresponding to the currently received user's voice based on the conversation pattern of the other service domain (S440).

Specifically, when it is determined that the currently received user's voice is included in another service domain even before all the slots constituting the current service domain are filled, the server may generate the response information corresponding to the currently received user's voice based on the conversation pattern of the other service domain using the previously received user's voice. Here, the server may determine the utterance intention included in the user's voice, and generate the response information corresponding to the determined utterance intention based on the conversation pattern of the other service domain.

When the currently received user's voice is included in the same service domain as the service domain including the previously received user's voice (S430-N), the server generates the response information corresponding to the currently received user's voice based on the conversation pattern of the service domain including the previously received user's voice (S450).

Next, the server transmits the generated response information to the display apparatus (S460).

The response information may include response message information corresponding to the user's voice and the display apparatus may output a response message corresponding to the user's voice based on the response message information.

Further, the response information may further include a control command for controlling a function of the display apparatus.

These exemplary embodiments have described in detailed and thus overlapping description thereof will be omitted.

A non-transitory computer-readable medium in which a program for sequentially executing the control method according to the exemplary embodiment may be provided.

The non-transitory computer-readable medium is not a medium configured to temporarily store data such as a register, a cache, or a memory, but a medium configured to semi-permanently store data and be readable by an apparatus. Specifically, the above-described various applications or programs may be stored in the non-transitory readable medium such as a compact disc (CD), a digital versatile disc (DVD), a hard disc, a blu-ray disc, a universal serial bus (USB), a memory card, and a read only memory (ROM) and provided.

A bus is not illustrated in the block diagram illustrating the display apparatus and the server, but the communication between the respective components in the display apparatus and server may be performed through the bus. Further, a processor performing the above-described various steps such as a central processing unit (CPU) or a microprocessor may be further included in each device.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A server which interacts with a display apparatus, the server comprising:

a storage which stores conversation patterns for service domains;

a communicator configured to receive a digital voice signal which is converted by the display apparatus; and a controller configured to convert the received digital voice signal into a text, determine a service domain related to the converted text, extract a component slot from the converted text based on the determined service domain, generate response information corresponding to the received digital voice signal based on the extracted component slot and a conversation pattern of the determined service domain, and to control the communicator to transmit the response information to the display apparatus, wherein when it is determined that a currently received digital voice signal is included in another service domain which is different from a service domain including a previously received digital voice signal, the controller generates the response information corresponding to the currently received digital voice signal based on a conversation pattern of the other service domain, and wherein if a component slot cannot be extracted from a currently received digital voice signal, the controller generates the response information corresponding to the currently received digital voice signal based on a component slot extracted from the previously received digital voice signal.

2. The server as claimed in claim 1, wherein when it is determined that the currently received digital voice signal is included in the other service domain even before slots constituting the service domain are filled with the previously received digital voice signal, the controller generates the response information corresponding to the currently received digital voice signal based on the conversation pattern of the other service domain.

3. The server as claimed in claim 2, wherein the controller determines an utterance intention included in the currently received digital voice signal, generate the response information corresponding to the determined utterance intention based on the conversation pattern of the other service domain, and controls the communicator to transmit the response information to the display apparatus.

4. The server as claimed in claim 1, wherein the response information comprises response message information corresponding to the voice, and the display apparatus outputs the response message corresponding to the voice based on the response message information.

5. The server as claimed in claim 4, wherein the response information further comprises a control command for controlling a function of the display apparatus.

6. The server as claimed in claim 1, wherein the voice expression is a voice expression of a user.

7. A method of controlling a server which interacts with a display apparatus, the method comprising:
  receiving a digital voice signal which is converted by the display apparatus;
  converting the received digital voice signal into a text;
  determining a service domain including the converted text, using conversation patterns;
  extracting a component slot from the converted text based on the determined service domain;
  generating response information corresponding to a currently received digital voice signal based on the extracted component slot and a conversation pattern of another service domain when the currently received digital voice signal is included in the other service domain which is different from a domain having a previously received digital voice signal; and
  transmitting the generated response information to the display apparatus,
  wherein the generating comprises, if a component slot cannot be extracted from a currently received digital voice signal, generating the response information corresponding to the currently received digital voice signal based on a component slot extracted from the previously received digital voice signal.

8. The method as claimed in claim 7 wherein the generating comprises generating the response information corresponding to the currently received digital voice signal based on the conversation pattern of the other service domain when it is determined that the currently received digital voice signal is included in the other service domain before slots constituting the service domain are filled with the previously received digital voice signal.

9. The method as claimed in claim 8, wherein the generating includes determining an utterance intention included in the received digital voice signal and generating the response information corresponding to the determined utterance intention based on the conversation pattern of the other service domain.

10. The method as claimed in claim 7, wherein the response information includes response message information corresponding to the received digital voice signal, and the display apparatus outputs a response message corresponding to the received digital voice signal based on the response message information.

11. The method as claimed in claim 10, wherein the response information further includes a control command for controlling a function of the display apparatus.

12. The method as claimed in claim 7, wherein the voice expression is a voice expression of a user.

13. A server which interacts with a display apparatus, the server comprising:
  a storage which stores conversation patterns for service domains;
  a communicator configured to receive a digital voice signal which is converted by the display apparatus; and
  a controller configured to convert the received digital voice signal into a text, determine a service domain among a plurality of service domains, each of said plurality of service domains being related to a corresponding conversation pattern, extract a component slot from the converted text based on the determined service domain, generate response information corresponding to the received digital voice signal based on the extracted component slot and a conversation pattern of the determined service domain, and to control the communicator to transmit the response information to the display apparatus,
  wherein if a component slot cannot be extracted from a currently received digital voice signal, the controller generates the response information corresponding to the currently received digital voice signal based on a component slot extracted from a previously received digital voice signal, the currently received digital voice signal being included in a domain different from another domain which includes the previously received digital voice signal.

14. The server as claimed in claim 13, wherein the controller determines an utterance intention included in the received digital voice signal, generate the response information corresponding to the determined utterance intention based on the conversation pattern, and controls the communicator to transmit the response information to the display apparatus.

15. A method of controlling a server which interacts with a display apparatus, the method comprising:
  receiving a digital voice signal which is converted by the display apparatus;
  converting the received digital voice signal into a text:
  determining a service domain related to the received digital voice signal among a plurality of service domains, using conversation patterns, each of the plurality of service domains being related to corresponding conversation patterns;
  extracting a component slot from the converted text based on the determined service domain;
  generating response information corresponding to the receive digital voice signal based on the extracted component slot and a conversation pattern of the determined service domain; and
  transmitting the generated response information to the display apparatus,
  wherein the generating comprises, if a component slot cannot be extracted from a currently received digital voice signal, generating the response information corresponding to the currently received digital voice signal based on a component slot extracted from a previously received digital voice signal, the currently received digital voice signal being included in a domain different from another domain which includes the previously received digital voice signal.

* * * * *